United States Patent
Suau et al.

(10) Patent No.: US 10,053,525 B2
(45) Date of Patent: Aug. 21, 2018

(54) METHOD FOR THE POLYMERISATION OF (METH)ACRYLIC ACID IN SOLUTION

(71) Applicant: COATEX, Genay (FR)

(72) Inventors: Jean-Marc Suau, Lucenay (FR); Clementine Champagne, Caluire-et-Cuire (FR)

(73) Assignee: COATEX, Genay (FR)

( * ) Notice: Subject to any disclaimer, the term of this patent is extended or adjusted under 35 U.S.C. 154(b) by 0 days.

(21) Appl. No.: 15/518,390

(22) PCT Filed: Oct. 12, 2015

(86) PCT No.: PCT/FR2015/052733
§ 371 (c)(1),
(2) Date: Apr. 11, 2017

(87) PCT Pub. No.: WO2016/066916
PCT Pub. Date: May 6, 2016

(65) Prior Publication Data
US 2017/0349681 A1 Dec. 7, 2017

(30) Foreign Application Priority Data
Oct. 29, 2014 (FR) ...................... 14 60366

(51) Int. Cl.
*C08F 120/06* (2006.01)

(52) U.S. Cl.
CPC ........ *C08F 120/06* (2013.01); *C08F 2438/03* (2013.01)

(58) Field of Classification Search
None
See application file for complete search history.

(56) References Cited

U.S. PATENT DOCUMENTS

| | | |
|---|---|---|
| 2007/0179262 A1 | 8/2007 | Suau et al. |
| 2011/0186773 A1 | 8/2011 | Suau et al. |
| 2012/0259083 A1 | 10/2012 | Suau et al. |
| 2014/0088250 A1 | 3/2014 | Suau et al. |
| 2015/0284555 A1 | 10/2015 | Suau et al. |

FOREIGN PATENT DOCUMENTS

WO    WO-2015092186 A1 * 6/2015 ............. C08F 20/06

OTHER PUBLICATIONS

International Search Report dated Jan. 12, 2016, in PCT/FR2015/052733, filed Oct. 12, 2015.

* cited by examiner

*Primary Examiner* — Catherine S Branch
(74) *Attorney, Agent, or Firm* — Oblon, McClelland, Maier & Neustadt, L.L.P.

(57) ABSTRACT

The present invention relates to the novel method for the preparation of a polymer of (meth)acrylic acid in aqueous solution, said polymer having a molecular mass of less than 6,500 g/mol, as measured by SEC, using a compound of copper carbonate type or one of its derivatives and a compound of formula (I):

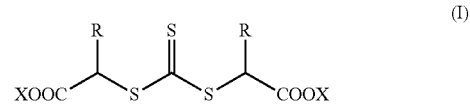

according to which:
  X represents Na, K or H and
  R represents an alkyl chain comprising from 1 to 5 carbon atoms.

16 Claims, No Drawings

METHOD FOR THE POLYMERISATION OF (METH)ACRYLIC ACID IN SOLUTION

The present invention relates to the technical field of the radical polymerisation of (meth)acrylic acid. More specifically, the present invention relates to a novel radical polymerisation method, to the polymers thus obtained and to their applications in industry.

CONTEXT OF THE INVENTION

Different radical polymerisation methods exist.

First of all, mention may be made of the methods which employ organic solvents, such as secondary alcohols, for example isopropanol. Today, these methods are not satisfactory as they generate volatile organic compounds (VOC).

There exist other methods for the synthesis of polyacrylic polymers which take place in water and which do not generate volatile organic compound.

One of these methods requires the use of hydrogen peroxide, which acts as initiator, and also, for example, copper sulfate, which acts as catalyst and chain transfer agent. Nevertheless, in order to result in a polymer which has a molecular mass of less than 6,000 g/mol, it is necessary to involve large amounts of catalyst(s), which generates large amounts of polluting byproducts often harmful to the use of said polymer.

Alternatively, thiolactic acid or another mercaptan RSH is used as additional chain transfer agent but, again, in order to obtain a polymer which has a molecular mass of less than 6,000 g/mol, it is necessary to involve large amounts of thiolactic acid(s) or more generally of transfer agent(s).

Yet other methods have resorted to sodium hypophosphite ($NaPO_2H_2$) as chain transfer and oxidation/reduction agents, in the presence of hydrogen peroxide or of radical generator. This has the major disadvantage of requiring large amounts of sodium hypophosphite, a fraction of the phosphorus being reencountered grafted in the polymer, another fraction of the phosphorus being reencountered in the form of phosphate salts in the method waters. This constitutes, on the one hand, a disadvantage during the use of the polymer and, on the other hand, an environmental pollutant.

Mention may also be made, among the different radical polymerisation methods, of controlled radical polymerisation of RAFT (Reversible Addition Fragmentation chain Transfer) type which makes it possible to carry out the living polymerisation of a monomer. Such a method additionally makes it possible to obtain polymers having low polydispersity indices PI (also called polymolecularity indices), which makes it particularly effective for certain applications.

In order to carry out a controlled radical polymerisation of RAFT type and thus to obtain a polymer of expected molecular mass having a good PI index, it is important to introduce, into the reaction medium, an available amount of chain transfer agent(s), in other words to involve an amount of chain transfer agent(s) such that each chain to be polymerised is functionalized by a chain transfer agent. In addition, it is important for this chain transfer agent to be already available when the polymerisation is initiated, that is to say when the polymerisation reactor is heated and when radicals are generated. This implies that large amounts of chain transfer agent(s) have to be employed in a controlled radical polymerisation method of RAFT type. This is all the truer as the targeted molecular masses have to be low, for example less than 10,000 g/mol.

Despite all the advantages resulting from a RAFT polymerisation, the use of such amounts of chain transfer agent(s) have a number of disadvantages.

First of all, it turns out that chain transfer agents are expensive products, which has a not insignificant effect on the cost of the polymer obtained.

Furthermore, when sulfur chain transfer agents as described in the documents WO 02/070571, WO 2005/095466 and WO 2006/024706 are used, it is found that the polymer which results from such a controlled radical polymerisation method of RAFT type carries, on its backbone, the chain transfer agent or residues of the latter. This can in particular be demonstrated by NMR analysis (Llauro et al., 2004). It is thus necessary to hydrolyze, for example with sodium hydroxide NaOH, the product resulting from the method, which constitutes an additional step in the method. Furthermore, it is found that a fraction of these compounds will be decomposed to give free sulfur byproducts of $CS_2$ and $H_2S$ type and will be reencountered in the final polymer aqueous solution and in the method run-off waters, which can thus have a negative impact on human being and on the environment. In addition, the presence of these sulfur byproducts in the aqueous solution generates, during the use of the polymer, releases of gases which are harmful to human being. This is particularly true when the polymer is used as dispersing agent or grinding aid agent of mineral matters, for example during the grinding of calcium carbonate $CaCO_3$.

BRIEF DESCRIPTION OF THE INVENTION

An object of the present invention is to propose a method which makes it possible to obtain an aqueous polymer solution which contains less byproducts of carbon sulfide or hydrogen sulfide type, so as to reduce the risks to human being and to the environment during the synthesis of the polymer, but also during the use of the polymer solution.

Another object of the present invention is to provide a process for the preparation of a polymer of (meth)acrylic acid having a molecular mass of less than 6,500 g/mol, for example of less than 6,000 g/mol, as measured by SEC.

Another object of the present invention is to propose a method for the preparation of a solvent-free polyacrylic polymer, that is to say which does not generate volatile organic compound.

Yet another object of the present invention is to propose a method for the manufacture of a polymer having a good PI index while managing the costs associated with the method.

Another object of the present invention is to propose a method for the manufacture of a polymer which does not comprise, on its backbone, phosphorus atoms and a minimum of sulfur atoms resulting from the polymerisation reactants and which is, in spite of everything, of low molecular weight.

Yet another object of the present invention is to reduce the amount of pollutants in the method waters relating to the use of reactants comprising sulfur and phosphorus.

DETAILED DESCRIPTION OF THE INVENTION

Method for the Preparation of the Polymer of (meth) acrylic acid

The present invention relates to a method for the preparation of a polymer of (meth)acrylic acid in aqueous solution, said polymer having a molecular mass of less than 6,500 g/mol, as measured by Size Exclusion Chromatography (SEC), comprising the following steps:
  a) water is introduced into the synthesis reactor, and also:
    a1) a compound of copper carbonate type or one of its derivatives,
    a2) optionally an iron salt, for example iron sulfate and/or optionally iron carbonate and
    a3) optionally an anionic monomer comprising a polymerisable unsaturated function and a carboxyl group, for example (meth)acrylic acid and/or maleic acid,
  b) the reactor is heated to a temperature of at least 60° C. and
  c) the following compounds are introduced into the reactor:
    c1) the (meth)acrylic monomer(s) to be polymerised,
    c2) a polymerisation initiating system and
    c3) a compound of formula (I):

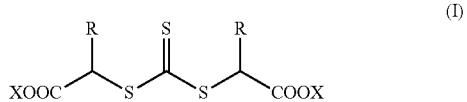

according to which:
  X represents Na, K or H and
  R represents an alkyl chain comprising from 1 to 5 carbon atoms.

Indeed, the method of the present invention makes it possible to obtain polymers which have a molecular mass of less than 6,500 g/mol, for example of less than 6,000 g/mol, for example of the order of 5,000 g/mol or 4,000 g/mol, as measured by SEC.

According to one embodiment of the present invention, the polymers have a molecular mass of greater than 500 g/mol, for example of greater than 1,000 g/mol, as measured by SEC.

The molecular mass Mw (or equivalently, in the context of the present invention, the molecular weight) of the polymers of the present invention can be determined by Size Exclusion Chromatography (SEC). Use is then made of commercial standards of sodium acrylate polymers in the powder form, the different molecular masses of which are certified by the supplier.

The present invention is based on the joint use, during the preparation of a polymer of (meth)acrylic acid in aqueous solution, of two compounds, more specifically:
  of a compound of copper carbonate $CuCO_3$ type or one of its derivatives and
  of a compound of formula (I):

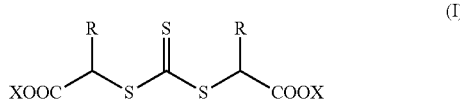

according to which:
  X represents Na, K or H and
  R represents an alkyl chain comprising from 1 to 5 carbon atoms.

Indeed, the simultaneous use of these two compounds makes it possible to prepare polymers of (meth)acrylic acid while having recourse, on the one hand, to a limited amount of sulfur chain transfer agent(s), in comparison with the controlled radical polymerisation of RAFT type as described in the documents WO 02/070571, WO 2005/095466 and WO 2006/024706 and, on the other hand, to limit the amount of water-soluble metal salts (in particular copper sulfate) used.

"Compound of copper carbonate type or one of its derivatives" is understood to mean the compound $CuCO_3$ or all other derivatives, for example $CuCO_3.Cu(OH)_2$. Mention is also made, for example, of malachite ($Cu_2(OH)_2CO_3$) and azurite/chessylite ($Cu_3(OH)_2(CO_3)_2$). In other words, a compound of copper carbonate type is a compound which comprises at least one copper atom and which dissolves and decomposes once in water under acidic conditions. Thus, such a compound cannot be regarded as a catalyst which, by definition, returns to its initial form after reaction.

The present invention differs in particular from the method described in the patent application WO 2014/049252 in that it uses such a compound, which makes it possible to limit even more the amount of salts in the method waters.

All the aspects of the present invention described below can be considered alone or in combination.

The polymer of the present invention is obtained by polymerisation of monomeric units. In the context of the present invention, these monomeric units are essentially (meth)acrylic acid monomers. These monomers are added to the synthesis reactor after the latter has been precharged with the compound of copper carbonate type or one of its derivatives and then heated to a temperature of at least 60° C.

It is also possible, according to an aspect of the present invention, to add, to the synthesis reactor, before heating it, anionic monomers comprising a polymerisable unsaturated function and a carboxyl group, for example (meth)acrylic acid and/or maleic acid.

This optional addition makes it possible to prepare special monomers, as explained later.

According to step a) of the method, it is possible to add, to the synthesis reactor, an iron salt.

"Iron salt" is understood to mean, for example, the compound $FeSO_4$ and all other hydrated derivatives, for example $FeSO_4.7H_2O$.

According to step a) of the method, it is also possible to add, to the synthesis reactor, iron carbonate $FeCO_3$ or all other derivatives.

According to step a) of the method, it is also possible to add, to the synthesis reactor, an anionic monomer comprising a polymerisable unsaturated function and a carboxyl group.

According to one embodiment, said anionic monomer a3) is chosen from the group consisting of acrylic acid, methacrylic acid, maleic acid, itaconic acid, crotonic acid and a mixture of these monomers.

According to another embodiment, a mixture of two or more different monomers a3) is added to the reactor. For example, it can be a mixture of acrylic acid monomers and of methacrylic acid monomers or a mixture of maleic acid, acrylic acid and methacrylic acid monomers.

According to yet another embodiment, said anionic monomer a3) is chosen from the group consisting of acrylic acid, methacrylic acid, maleic acid and a mixture of these monomers.

When such monomers a3) are added to the synthesis reactor in step a), a certain amount of a "special monomer", namely, for example, copper acrylate, copper methacrylate and/or copper maleate, is prepared. A mixture of special monomers, for example in the acrylate or diacrylate, methacrylate or dimethacrylate, maleate or dimaleate form, in view of the ionicity of copper in aqueous solution, may be concerned. The acid monomer (acrylic acid, methacrylic acid and/or maleic acid) can occur in excess with respect to the compound comprising copper atoms, so that all the $Cu^{2+}$ ions of this compound are found in the solvated form.

According to another embodiment, when such monomers a3) are added to the synthesis reactor in step a) and when an iron salt, for example iron sulfate and/or iron carbonate, is also added, a certain amount of a "special monomer", namely, for example, copper/iron acrylate, copper/iron methacrylate and/or copper/iron maleate, is prepared. It can be a mixture of special monomers, for example in the acrylate or diacrylate, methacrylate or dimethacrylate, maleate or dimaleate form, in view of the ionicity of copper and iron in aqueous solution. The acid monomer (acrylic acid, methacrylic acid and/or maleic acid) can occur in excess with respect to the compound comprising copper atoms, so that all of the $Cu^{2+}$ and $Fe^{2+}$ ions of this compound occur in the solvated form.

According to the present invention, the (meth)acrylic acid polymer in solution obtained by polymerisation, according to the method described above, has a molecular mass of less than 6,500 g/mol. According to one embodiment, it additionally has a polydispersity index PI of less than 3, for example between 2 and 3.

The polymers are generally characterized by two indices/quantities/values:
the polymolecularity index PI (also known equivalently as polydispersity PD) and
the molecular mass Mw (also known equivalently as molar mass or molecular weight), expressed in g/mol.

The polymolecularity index corresponds to the distribution of the molar masses of the different macromolecules within the (meth)acrylic acid polymer. If all the macromolecules have one and the same length (thus one and the same molecular mass), this index is approximately 1. If, on the other hand, the macromolecules have different lengths (thus different molecular masses), the PI index is greater than 1. The closer the PI index of the polymer is to 1, the more effective the latter is in its various applications. Nevertheless, it can prove to be very costly to obtain a (meth)acrylic acid polymer having a PI index close to 1. The method of the present invention makes it possible to obtain a (meth)acrylic acid polymer having a good PI index while managing the costs associated with the method.

According to one embodiment, the PI index of the polymer of (meth)acrylic acid in aqueous solution obtained according to the method of the present invention is less than 3.

According to one embodiment, the PI index of the polymer of (meth)acrylic acid in aqueous solution obtained according to the method of the present invention is less than 2.7, as calculated according to PI=Mw/Mn, Mw and Mn being measured by SEC.

According to step b) of the method which is an object of the present invention, the synthesis reactor is heated to a minimum temperature of 60° C. before the introduction of the monomers to be polymerised.

According to one aspect of the present invention, the reactor is heated to a temperature of at least 80° C., for example to 95° C.

A temperature of at least 60° C., for example of 85° C. or of 90° C., is maintained throughout the polymerisation step c).

The polymerisation step c) comprises the addition, according to c1), of at least one (meth)acrylic monomer.

"The (meth)acrylic monomer(s) to be polymerised" is understood to mean that the method of the invention is targeted at manufacturing either a polymer constituted exclusively of acrylic acid (acrylic acid homopolymer) or a polymer constituted exclusively of methacrylic acid (methacrylic acid homopolymer) or alternatively a polymer constituted of a mixture of acrylic acid and methacrylic acid (acrylic acid/methacrylic acid copolymer). In the latter case, according to one aspect of the invention, the molar ratio between acrylic acid and methacrylic acid can vary between 1:100 and 100:1, for example between 1:1 and 100:1 or between 1:1 and 50:1. Furthermore, the (meth)acrylic monomer to be polymerised occurs in the acid form or optionally partially neutralized, for example with NaOH.

According to one embodiment of the present invention, the mass percentage (weight/weight) between the monomer a3) and the methacrylic monomer(s) to be polymerised c1) is less than 10%.

The polymerisation step c) also requires the use of a polymerisation initiating system c2). "Polymerisation initiating system" is understood to mean a system capable of initiating the polymerisation of the monomers. It is conventionally a chemical compound with the ability to generate free radicals.

According to one aspect of the present invention, the polymerisation initiating system is chosen from the group consisting of hydrogen peroxide ($H_2O_2$), sodium persulfates, potassium persulfates, ammonium persulfates, hydroperoxides and a mixture of at least two of these compounds.

According to another aspect of the present invention, the polymerisation initiating system used in step c2) is hydrogen peroxide, $H_2O_2$. The use of this initiating system is preferred as it makes it possible to limit the presence of sulfate salts.

Step c) of the method of the present invention also uses at least one compound of formula (I):

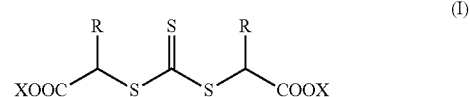

according to which:
X represents Na, K or H and
R represents an alkyl chain comprising from 1 to 5 carbon atoms.

"Alkyl chain comprising from 1 to 5 carbon atoms" is understood to mean a methyl, ethyl, propyl, isopropyl, butyl, tert-butyl, isobutyl or pentyl chain.

According to one aspect of the present invention, said at least one compound of formula (I) is dipropyl trithiocarbonate (DPTTC, CAS No. 6332-91-8) or its salts, for example its disodium salt (sodium dipropionate trithiocarbonate, CAS No. 86470-33-2, Mw=298.31 g/mol), as represented by the formula (II) below:

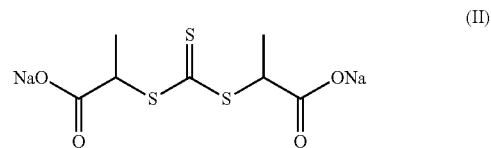

According to one embodiment of the present invention, the molar percentage (mol/mol) between said compound of formula (I) and said anionic monomer(s) to be polymerised is between 0.001% and 1%, for example between 0.01% and 0.8% or between 0.02% and 0.5%.

"Said anionic monomer(s) to be polymerised" is understood to mean all of the anionic monomers to be polymerised present in the synthesis reactor. The (meth)acrylic monomer (s) according to c1) is/are mainly concerned. Anionic monomers according to a3) will also be concerned.

According to one embodiment of the present invention, the mass percentage (weight/weight) between said chain transfer agent and said anionic monomer(s) is between 0.1% and 2.5%, for example between 0.15% and 2.1% or between 0.15% and 1.5%.

According to one embodiment of the present invention, said compound of formula (I) is the compound (II), that is to say the compound (I) in which X represents Na and R represents $CH_3$ and the mass percentage (weight/weight) between said compound of formula (I) and said anionic monomer(s) is between 0.1% and 1.75%, for example between 0.15% and 1.5% or between 0.15% and 0.5%.

The constituents can be introduced into the synthesis reactor "continuously", that is to say at a constant or variable speed, but without stopping the introduction.

Furthermore, the constituents can be introduced into the synthesis reactor "simultaneously", that is to say that the different constituents are introduced concomitantly.

According to one embodiment of the method of the present invention, the constituents are introduced into the synthesis reactor "proportionally", that is to say that the proportion of each constituent of the mixture introduced into the synthesis reactor remains constant over the reaction time, with respect to the other constituents of the mixture.

According to one embodiment of the present invention, step a) of the method consists in introducing, into a synthesis reactor:
water,
copper carbonate $CuCO_3$ or one of its derivatives and
(meth)acrylic acid and/or maleic acid.

This step leads to the preparation of a copper (meth) acrylate and/or of a copper maleate in the synthesis reactor.

"Copper (meth)acrylate" is understood to mean a copper acrylate and/or a copper methacrylate.

According to one embodiment, the (meth)acrylic acid and/or the maleic acid is/are found in molar excess with respect to the copper carbonate compound or one of its derivatives, so that all of the copper atoms are in the ionized form in the synthesis reactor.

According to another aspect of the invention, the mass percentage (weight/weight) between the copper (meth)acrylate and/or the copper maleate obtained in step a) and said (meth)acrylic monomer(s) to be polymerised according to step c) and optionally a3) is between 0.5% and 5%, for example between 1% and 4% or between 1.5% and 3%.

According to another embodiment of the present invention, step a) of the method consists in introducing, into a synthesis reactor:
water,
copper carbonate $CuCO_3$ or one of its derivatives,
iron sulfate $FeSO_4$ (or one of its hydrated derivatives) and/or iron carbonate $FeCO_3$ and
(meth)acrylic acid and/or maleic acid.

This step leads to the preparation of a copper/iron (meth) acrylate and/or of a copper/iron maleate in the synthesis reactor.

"Copper/iron (meth)acrylate" is understood to mean a copper/iron acrylate and/or a copper/iron methacrylate.

According to one embodiment, the (meth)acrylic acid and/or the maleic acid is/are found in molar excess with respect to the copper carbonate or one of its derivatives, iron sulfate and iron carbonate, so that all of the copper and iron atoms are in the ionized form in the synthesis reactor.

According to another aspect of the invention, the mass percentage (weight/weight) between the iron salt, for example iron sulfate or one of its hydrated derivatives, and said (meth)acrylic monomer(s) to be polymerised is between 0.01% and 3%, for example between 0.03% and 1% or between 0.05% and 0.5%.

According to one embodiment of the present invention, the molar percentage (mol/mol) between the compound of copper carbonate type or one of its derivatives a1) and said anionic monomer(s) to be polymerised is between 0.001% and 3%, for example between 0.005% and 1% or between 0.01% and 0.8%.

According to another embodiment of the present invention, the molar percentage (mol/mol) between the iron salt and/or the iron carbonate a2) and said anionic monomer(s) to be polymerised is between 0.001% and 3%, for example between 0.005% and 1% or between 0.01% and 0.5%.

According to a more particularly preferred embodiment of the present invention, no iron salt, for example iron sulfate, is introduced into the synthesis reactor during the method.

According to another aspect of the invention, the method does not comprise any step of removal of the reaction byproducts after the polymerisation step c).

According to another aspect of the present invention, the method comprises an additional step of partial or complete neutralization of the polymer.

The molar percentage for neutralization of the active acid sites of the polymer by a neutralization agent can, for example, vary between 10% and 90%, for example between 15% and 85%.

The neutralization of the polymer obtained can also be simple (just one neutralization agent) or multiple (several neutralization agents).

The neutralizing agent is chosen so that the counterion present in the polymer solution after neutralization is, for example, chosen from the group consisting of the calcium ion, the sodium ion, the potassium ion, the lithium ion, the magnesium ion, the barium ion, the zinc ion, the aluminum ion and an amine.

For example, it is possible to envisage the following modes of neutralization, alone or in combination:
a molar percentage of neutralization of the active acid sites of the polymer by a neutralization agent containing the calcium ion of between 15% and 40%, for example of between 20% and 35%,
a molar percentage of neutralization of the active acid sites of the polymer by one or more monofunctional neutralization agent(s) containing the sodium ion of between 7% and 70%, for example of between 20% and 60% and
a molar percentage of neutralization of the active acid sites of the polymer by a neutralization agent containing the magnesium, barium, zinc or aluminum ion or an amine or their mixtures and in particular by a neutralization agent containing the magnesium ion of between 0% and 30%, for example of between 5% and 25%.

Combination of Compounds for Preparing a (Meth) Acrylic Acid Polymer in Solution The present invention also relates to the use of at least one compound of copper carbonate type or one of its derivatives and of a compound of formula (I):

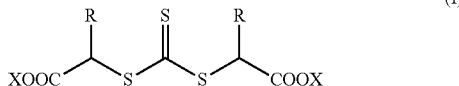
(I)

according to which:
X represents Na, K or H and
R represents an alkyl chain comprising from 1 to 5 carbon atoms, for preparing a polymer of (meth) acrylic acid in solution, said polymer having a molecular mass of less than 6,500 g/mol, as measured by SEC.

The present invention also relates to the use:
of at least one compound of copper carbonate type or one of its derivatives,
of an iron salt, for example iron sulfate and/or optionally iron carbonate, and
of a compound of formula (I):

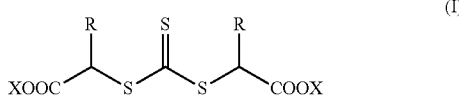
(I)

according to which:
X represents Na, K or H and
R represents an alkyl chain comprising from 1 to 5 carbon atoms, for preparing a polymer of (meth) acrylic acid in solution, said polymer having a molecular mass of less than 6,500 g/mol, as measured by SEC.

According to one aspect of the present invention, said at least one compound of formula (I) is dipropyl trithiocarbonate (DPTTC, CAS No. 6332-91-8) or its salts, for example its di sodium salt (sodium dipropionate trithiocarbonate, CAS No. 86470-33-2), as represented by the formula (II) below:

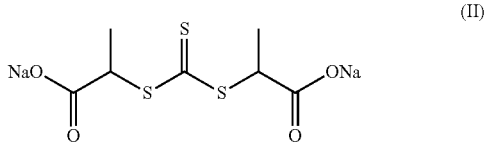
(II)

and is used to prepare said polymer of (meth)acrylic acid in solution, said polymer having a molecular mass of less than 6,500 g/mol, as measured by SEC.

EXAMPLES

In each of the following examples, the molecular mass of the polymers according to the invention (for example the average molecular mass Mw or the number molecular mass Mn) is determined by Size Exclusion Chromatography (SEC) or Gel Permeation Chromatography (GPC).

Such a technique uses a liquid chromatography device of the WATERS™ brand equipped with a detector. The latter is a refractometric concentration detector of the WATERS™ brand.

This liquid chromatography device is equipped with a size exclusion column suitably chosen by the person skilled in the art in order to separate the different molecular weights of the polymers studied.

The liquid elution phase is an aqueous phase adjusted to pH 9.00 with 1N sodium hydroxide solution containing 0.05M of $NaHCO_3$, 0.1M of $NaNO_3$, 0.02M of triethanolamine and 0.03% of $NaN_3$.

In a detailed manner, according to a first step, the polymerisation solution is diluted to a dry weight of 0.9% in the dissolution solvent for the SEC, which corresponds to the liquid elution phase of the SEC to which is added 0.04% of dimethylformamide, which acts as flow marker or internal standard. Filtration is then carried out through a 0.2 μm filter. 100 μL are subsequently injected into the chromatography device (eluent: an aqueous phase adjusted to pH 9.00 with 1N sodium hydroxide solution containing 0.05M of $NaHCO_3$, 0.1M of $NaNO_3$, 0.02M of triethanolamine and 0.03% of $NaN_3$).

The liquid chromatography device contains an isocratic pump (WATERS™ 515), the flow rate of which is adjusted to 0.8 ml/min. The chromatography device also comprises an oven which itself comprises, in series, the following system of columns: a precolumn of GUARD COLUMN ULTRAHYDROGEL WATERS™ type with a length of 6 cm and an internal diameter of 40 mm and a linear column of ULTRAHYDROGEL WATERS™ type with a length of 30 cm and an internal diameter of 7.8 mm. The detection system, for its part, is composed of a refractometric detector of RI WATERS™ 410 type. The oven is brought to a temperature of 60° C. and the refractometer is brought to a temperature of 45° C.

The chromatography device is calibrated with sodium polyacrylate powder standards of different molecular masses certified by the supplier: POLYMER STANDARD SERVICE or AMERICAN POLYMER STANDARDS CORPORATION.

The polydispersity index PI of the polymer is the ratio of the average molecular mass Mw to the number molecular mass Mn, the values of which are determined as described above in Size Exclusion Chromatography. Thus, the PI index is calculated according to PI=Mw/Mn, Mw and Mn being measured by SEC.

The amount of residual monomers is measured according to conventional techniques known to the person skilled in the art, for example by High Performance Liquid Chromatography (HPLC).

Example 1

The object of this example is to illustrate the preparation of (meth)acrylic acid polymers according to the invention by the use:
of a dipropionate trithiocarbonate (DPTTC) salt,
of copper carbonate in the $CuCO_3.Cu(OH)_2$ form and optionally of iron carbonate in the $FeCO_3$ form.

Test 1—Outside the Invention:

According to this test outside the invention, copper carbonate in the $CuCO_3.Cu(OH)_2$ form is not introduced. Neither is dipropionate trithiocarbonate (DPTTC) salt used. Use is made, in place of the compounds provided by the present invention, of an iron salt in the $FeSO_4.7H_2O$ form.

0.28 g of iron sulfate in the $FeSO_4.7H_2O$ form ($1.0 \times 10^{-3}$ mol), 0.15 g of iron carbonate in the $FeCO_3$ form ($1.3 \times 10^{-3}$ mol) and 10 g of acrylic acid (0.139 mol) are charged to the glass synthesis reactor equipped with a mechanical agitation and with heating of oil bath type.

Heating is carried out until a temperature of 90° C. is reached.

The following are added simultaneously and continuously over a time of 2 h:
- 269.8 g of acrylic acid (3.75 mol) and
- 35.3 g of 35% $H_2O_2$ dissolved in 9.4 g of water.

Cooking is carried out for 1 h 30 at 90° C.

Neutralization is carried out with 50% sodium hydroxide solution until a pH=8 is obtained.

Test 2—Outside the Invention:

According to this test outside the invention, iron sulfate in the $FeSO_4.7H_2O$ form is not introduced. Neither is dipropionate trithiocarbonate (DPTTC) salt used.

245 g of water, 0.29 g of copper carbonate in the $CuCO_3.Cu(OH)_2$ form ($1.2 \times 10^{-3}$ mol) and 2.5 g of acrylic acid (0.0347 mol) are charged to the glass synthesis reactor equipped with a mechanical agitation and with heating of oil bath type.

Heating is carried out until a temperature of 90° C. is reached.

The following are added simultaneously and continuously over a time of 2 h:
- 277.3 g of acrylic acid (3.85 mol) and
- 35.3 g of 35% $H_2O_2$ dissolved in 9.4 g of water.

Cooking is carried out for 1 h 30 at 90° C.

Neutralization is carried out with 50% sodium hydroxide solution until a pH 8 is obtained.

Test 3—Outside the Invention:

According to this test outside the invention, dipropionate trithiocarbonate (DPTTC) salt is not introduced.

245 g of water, 0.29 g of copper carbonate in the $CuCO_3.Cu(OH)_2$ form ($1.2 \times 10^{-3}$ mol), 0.28 g of iron sulfate in the $FeSO_4.7H_2O$ form ($1.0 \times 10^{-3}$ mol) and 10 g of acrylic acid (0.139 mol) are charged to the glass synthesis reactor equipped with a mechanical agitation and with heating of oil bath type.

Heating is carried out until a temperature of 90° C. is reached.

The following are added simultaneously and continuously over a time of 2 h:
- 274.8 g of acrylic acid (3.82 mol) and
- 35.3 g of 35% $H_2O_2$ dissolved in 9.4 g of water.

Cooking is carried out for 1 h 30 at 90° C.

Neutralization is carried out with 50% sodium hydroxide solution until a pH 8 is obtained.

Test 4—Outside the Invention:

According to this test outside the invention, copper carbonate in the $CuCO_3.Cu(OH)_2$ form is not introduced.

245 g of water, 0.28 g of iron sulfate in the $FeSO_4.7H_2O$ form ($1.0 \times 10^{-3}$ mol) and 2.5 g of acrylic acid (0.0347 mol) are charged to the glass synthesis reactor equipped with a mechanical agitation and with heating of oil bath type.

Heating is carried out until a temperature of 90° C. is reached.

The following are added simultaneously and continuously over a time of 2 h:
- 277.3 g of acrylic acid (3.85 mol),
- 35.3 g of 35% $H_2O_2$ dissolved in 9.4 g of water and
- 4.4 g of 20.9% DPTTC dissolved in 33.5 g of water (i.e., 0.9 g of 100% DPTTC or $3 \times 10^{-3}$ mol).

Cooking is carried out for 1 h 30 at 90° C.

Neutralization is carried out with 50% sodium hydroxide solution until a pH=8 is obtained.

Test 5—Invention:

245 g of water, 0.29 g of copper carbonate in the $CuCO_3.Cu(OH)_2$ form ($1.2 \times 10^{-3}$ mol), 0.28 g of iron sulfate in the $FeSO_4.7H_2O$ form ($1.0 \times 10^{-3}$ mol) and 15 g of acrylic acid (0.208 mol) are charged to the glass synthesis reactor equipped with a mechanical agitation and with heating of oil bath type.

Heating is carried out until a temperature of 90° C. is reached.

The following are added simultaneously and continuously over a time of 2 h:
- 264.8 g of acrylic acid (3.68 mol),
- 35.3 g of 35% $H_2O_2$ dissolved in 9.4 g of water and
- 5.4 g of 20.9% DPTTC (i.e., 1.1 g of 100% DPTTC or $4 \times 10^{-3}$ mol) dissolved in 34.4 g of water.

Cooking is carried out for 1 h 30 at 90° C.

Neutralization is carried out with 50% sodium hydroxide solution until a pH=8 is obtained.

Test 6—Invention:

245 g of water, 0.29 g of copper carbonate in the $CuCO_3.Cu(OH)_2$ form ($1.2 \times 10^{-3}$ mol), 0.28 g of iron sulfate in the $FeSO_4.7H_2O$ form ($1.0 \times 10^{-3}$ mol) and 2.5 g of acrylic acid (0.0347 mol) are charged to the glass synthesis reactor equipped with a mechanical agitation and with heating of oil bath type.

Heating is carried out until a temperature of 90° C. is reached.

The following are added simultaneously and continuously over a time of 2 h:
- 277.3 g of acrylic acid (3.85 mol),
- 35.3 g of 35% $H_2O_2$ dissolved in 9.4 g of water and
- 4.35 g of 20.9% DPTTC (i.e., 0.9 g of 100% DPTTC or $3 \times 10^{-3}$ mol) dissolved in 33.5 g of water.

Cooking is carried out for 1 h 30 at 90° C.

Neutralization is carried out with 50% sodium hydroxide solution until a pH=8 is obtained.

Test 7—Invention:

245 g of water, 0.29 g of copper carbonate in the $CuCO_3.Cu(OH)_2$ form ($1.2 \times 10^{-3}$ mol) and 0.28 g of iron sulfate in the $FeSO_4.7H_2O$ form ($1.0 \times 10^{-3}$ mol) are charged to the glass synthesis reactor equipped with a mechanical agitation and with heating of oil bath type. According to this test, no anionic monomer of (meth)acrylic or maleic acid type is introduced into the vessel heel of the reactor.

Heating is carried out until a temperature of 90° C. is reached.

The following are added simultaneously and continuously over a time of 2 h:
- 279.8 g of acrylic acid (3.89 mol),
- 35.3 g of 35% $H_2O_2$ dissolved in 9.4 g of water and
- 4.35 g of 20.9% DPTTC (i.e., 0.9 g of 100% DPTTC or $3 \times 10^{-3}$ mol) dissolved in 33.5 g of water.

Cooking is carried out for 1 h 30 at 90° C.

Neutralization is carried out with 50% sodium hydroxide solution until a pH=8 is obtained.

Test 8—Invention:

245 g of water, 0.29 g of copper carbonate in the $CuCO_3.Cu(OH)_2$ form ($1.2 \times 10^{-3}$ mol) and 5.3 g of acrylic acid (0.0736 mol) are charged to the glass synthesis reactor equipped with a mechanical agitation and with heating of oil bath type.

Heating is carried out until a temperature of 90° C. is reached.

The following are added simultaneously and continuously over a time of 2 h:
- 274.5 g of acrylic acid (3.81 mol),
- 35.3 g of 35% $H_2O_2$ dissolved in 9.4 g of water and
- 4.4 g of 20.9% DPTTC dissolved in 33.5 g of water (i.e., 0.9 g of 100% DPTTC or $3 \times 10^{-3}$ mol).

Cooking is carried out for 1 h 30 at 90° C.

Neutralization is carried out with 50% sodium hydroxide solution until a pH=8 is obtained.

All the results have been combined in Table 1.

TABLE 1

| Test No. | Molar % DPTTC/ monomers | Molar % CuCO$_3$/ monomers | Molar % FeSO$_4$/ monomers | Mw (g/mol) | PI |
|---|---|---|---|---|---|
| 1 - OINV | na | na | 0.026 | 36,000 | 6.4 |
| 2 - OINV | na | 0.03 | na | 12,060 | 3.2 |
| 3 - OINV | na | 0.03 | 0.026 | 6,860 | 2.7 |
| 4 - OINV | 0.08 | na | 0.026 | 38,765 | 5.1 |
| 5 - INV | 0.10 | 0.03 | 0.026 | 4,060 | 2.3 |
| 6 - INV | 0.08 | 0.03 | 0.026 | 4,055 | 2.3 |
| 7 - INV | 0.08 | 0.03 | 0.026 | 4,540 | 2.3 |
| 8 - INV | 0.08 | 0.03 | na | 5,885 | 2.6 | na: not applicable
INV: INVention
OINV: Outside the INVention
Molar % DPTTC/monomers: molar percentage (mol/mol) between said compound of formula (I) and said anionic monomer(s) to be polymerised
Molar % CuCO$_3$/monomers: molar percentage (mol/mol) between the compound of copper carbonate type or one of its derivatives a1) and said anionic monomer(s) to be polymerised; in the case in point, the compound of copper carbonate type is CuCO$_3$•Cu(OH)$_2$.

The operating conditions of tests 5 to 8 make it possible to obtain a polymer of (meth)acrylic acid in aqueous solution, said polymer having a molecular mass of less than 6,500 g/mol, as measured by SEC, and a PI index of less than 2.7.

The invention claimed is:

1. A method for preparing a polymer of (meth)acrylic acid in aqueous solution, said polymer having a molecular mass of less than 6,500 g/mol, as measured by Size Exclusion Chromatography (SEC), the method comprising:
    a) introducing water into a synthesis reactor, and also introducing:
        a1) a compound of copper carbonate type or one of its derivatives,
        a2) optionally an iron salt and/or optionally iron carbonate, and
        a3) optionally anionic monomer(s) to be polymerised comprising a polymerisable unsaturated function and a carboxyl group,
    b) heating the reactor to a temperature of at least 60° C. and
    c) introducing the following compounds into the reactor:
        c1) (meth)acrylic monomer(s) to be polymerised,
        c2) a polymerisation initiating system and
        c3) a compound of formula (I):

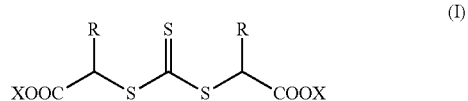

wherein:
    X represents Na, K or H, and
    R represents an alkyl chain comprising from 1 to 5 carbon atoms.

2. The method according to claim 1, wherein a molar percentage (mol/mol) bet en the compound of copper carbonate type or one of its derivatives a1) and said anionic monomer(s) to be polymerised is between 0.001% and 3%.

3. The method according to claim 1, wherein molar percentage (mol/mol) between the iron salt and/or the iron carbonate a2) and said anionic monomer(s) to be polymerised is between 0.001% and 3%.

4. The method according to claim 1, wherein no iron salt is introduced into the synthesis reactor during the method.

5. The method according to claim 1, wherein a mass percentage (weight/weight) between the monomer a3) and the methacrylic monomer(s) to be polymerised c1) is less than 10%.

6. The method according to claim 1, wherein a molar percentage (mol/mol) between said compound of formula (I) and said anionic monomer(s) to be polymerised is between 0.001% and 1%.

7. The method according to claim 1, wherein said method does not comprise any removal of reaction byproducts after the polymerisation c).

8. The method according to claim 1, wherein said method further comprises partial or complete neutralization of the polymer.

9. The method according to claim 1, wherein said polymer of (meth)acrylic acid in aqueous solution has a PI index of less than 2.7, as calculated according to PI=Mw/Mn, Mn and Mn being measured by SEC.

10. A method, comprising combining at least one compound of copper carbonate type or one of its derivatives, (meth)acrylic monomer(s) to be polymerised, a polymerisation initiating system, and a compound of formula (I) in a solvent to prepare a polymer of (meth)acrylic acid in solution:

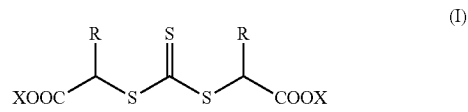

wherein:
    X represents Na, K or H and
    R represents an alkyl chain comprising from 1 to 5 carbon atoms,
said polymer having a molecular mass of less than 6,500 g/mol, as measured by SEC.

11. A method, comprising combining, in a solvent:
    at least one compound of copper carbonate type or one of its derivatives,
    an iron salt and/or optionally iron carbonate,
    (meth)acrylic monomer(s) to be polymerised,
    a polymerisation initiating system, and
    a compound of formula (I):

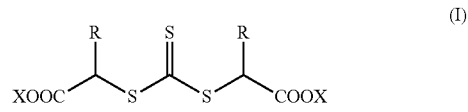

wherein:
    X represents Na, K or H and
    R represents an alkyl chain comprising from 1 to 5 carbon atoms,
    to prepare a polymer of (meth)acrylic acid in solution, said polymer having a molecular mass of less than 6,500 g/mol, as measured by SEC.

12. The method according to claim 1, wherein said polymer of (meth)acrylic acid has a molecular mass of less than 6,500 g/mol and greater than 500 g/mol as measured by Size Exclusion Chromatography (SEC).

13. The method according to claim 1, wherein said polymer of (meth)acrylic acid has a molecular mass of less than 6,000 g/mol and greater than 1,000 g/mol as measured by Size Exclusion Chromatography (SEC).

14. The method according to claim 12, wherein said at least one compound of formula (I) is dipropyl trithiocarbonate or its salts.

15. The method according to claim 10, wherein said polymer of (meth)acrylic acid has a molecular mass of less than 6,500 g/mol and greater than 500 g/mol as measured by Size Exclusion Chromatography (SEC).

16. The method according to claim 11, wherein said polymer of (meth)acrylic acid has a molecular mass of less than 6,500 g/mol and greater than 500 g/mol as measured by Size Exclusion Chromatography (SEC).

* * * * *